US011052570B2

(12) United States Patent
Rudolph et al.

(10) Patent No.: US 11,052,570 B2
(45) Date of Patent: Jul. 6, 2021

(54) PROCESS FOR PRODUCING FOAMS BASED ON THERMOPLASTIC POLYURETHANES

(71) Applicant: BASF SE, Ludwigshafen (DE)

(72) Inventors: Hans Rudolph, Bad Essen (DE); Etsuhiro Yamamoto, Yatomi (JP); Eiji Negishi, Funabashi (JP); Akira Nomura, Singapore (SG); Tatsuro Tomata, Fuji (JP)

(73) Assignee: BASF SE, Ludwigshafen (DE)

( * ) Notice: Subject to any disclaimer, the term of this patent is extended or adjusted under 35 U.S.C. 154(b) by 144 days.

(21) Appl. No.: 15/551,314

(22) PCT Filed: Feb. 9, 2016

(86) PCT No.: PCT/EP2016/052676
§ 371 (c)(1),
(2) Date: Aug. 16, 2017

(87) PCT Pub. No.: WO2016/131671
PCT Pub. Date: Aug. 25, 2016

(65) Prior Publication Data
US 2018/0066122 A1 Mar. 8, 2018

(30) Foreign Application Priority Data

Feb. 17, 2015 (EP) .................................... 15155374

(51) Int. Cl.
| | | |
|---|---|---|
| *B29B 7/88* | (2006.01) | |
| *B29C 48/05* | (2019.01) | |
| *B29C 48/00* | (2019.01) | |
| *B29C 48/345* | (2019.01) | |
| *B29C 48/385* | (2019.01) | |
| *B29B 9/06* | (2006.01) | |
| *B29C 44/34* | (2006.01) | |
| *C08J 9/12* | (2006.01) | |
| *B29B 9/12* | (2006.01) | |
| *C08J 9/34* | (2006.01) | |
| *C08J 9/16* | (2006.01) | |
| *C08J 9/236* | (2006.01) | |
| *C08J 9/18* | (2006.01) | |
| *B29K 75/00* | (2006.01) | |
| *B29K 101/12* | (2006.01) | |
| *B29C 48/04* | (2019.01) | |
| *B29K 105/04* | (2006.01) | |

(52) U.S. Cl.
CPC ............... *B29B 7/88* (2013.01); *B29B 9/065* (2013.01); *B29B 9/12* (2013.01); *B29C 44/3446* (2013.01); *B29C 44/3461* (2013.01); *B29C 48/0012* (2019.02); *B29C 48/0022* (2019.02); *B29C 48/05* (2019.02); *B29C 48/345* (2019.02); *B29C 48/385* (2019.02); *C08J 9/122* (2013.01); *C08J 9/16* (2013.01); *C08J 9/18* (2013.01); *C08J 9/236* (2013.01); *C08J 9/34* (2013.01); *B29C 48/04* (2019.02); *B29K 2075/00* (2013.01); *B29K 2101/12* (2013.01); *B29K 2105/04* (2013.01); *B29K 2995/0063* (2013.01); *C08J 2201/026* (2013.01); *C08J 2201/03* (2013.01); *C08J 2203/06* (2013.01); *C08J 2203/182* (2013.01); *C08J 2300/22* (2013.01); *C08J 2300/26* (2013.01); *C08J 2375/04* (2013.01)

(58) Field of Classification Search
CPC ........................................................ C08J 9/18
See application file for complete search history.

(56) References Cited

U.S. PATENT DOCUMENTS

| | | | | |
|---|---|---|---|---|
| 5,674,916 A | * | 10/1997 | Shmidt | .................. C08J 9/0066 |
| | | | | 264/50 |
| 9,884,947 B2 | * | 2/2018 | Prissok | .............. C08G 18/4854 |
| 2007/0100008 A1 | * | 5/2007 | Chang | ....................... C08J 9/122 |
| | | | | 521/79 |
| 2012/0053255 A1 | * | 3/2012 | Koerner | .................. C08L 25/06 |
| | | | | 521/59 |
| 2012/0329892 A1 | * | 12/2012 | Prissok | .............. C08G 18/7657 |
| | | | | 521/60 |
| 2013/0078445 A1 | * | 3/2013 | Ramesh | ..................... C08L 3/02 |
| | | | | 428/220 |
| 2014/0343184 A1 | * | 11/2014 | Axelrad | ..................... C08J 9/36 |
| | | | | 521/180 |

(Continued)

FOREIGN PATENT DOCUMENTS

| | | |
|---|---|---|
| WO | 2007/082838 A1 | 7/2007 |
| WO | 2013/153190 A1 | 10/2013 |
| WO | WO-2013153190 A1 * 10/2013 | ......... C08G 18/6674 |

OTHER PUBLICATIONS

Machine Translation of WO2013153190A1 (Year: 2013).*

(Continued)

*Primary Examiner* — Matthew J Daniels
*Assistant Examiner* — Wayne K. Swier
(74) *Attorney, Agent, or Firm* — Grüneberg and Myers PLLC

(57) ABSTRACT

A process for producing foamed thermoplastic polyurethane particles comprises the steps of a) melting a thermoplastic polyurethane in a first extruder (E1), b) injecting a gaseous blowing agent in a second extruder (E2), c) impregnating the gaseous blowing agent homogeneously into the thermoplastic polyurethane melt in a third extruder (E3), d) extruding the impregnated thermoplastic polyurethane melt through a die plate and granulating the melt in an underwater granulation device under temperature and pressure conditions to form foamed thermoplastic polyurethane particles.

8 Claims, No Drawings

(56) References Cited

U.S. PATENT DOCUMENTS

| | | |
|---|---|---|
| 2015/0174808 A1 | 6/2015 | Rudolph et al. |
| 2015/0183989 A1* | 7/2015 | Manitiu ................. B29C 48/09 |
| | | 525/66 |
| 2017/0246765 A1* | 8/2017 | Huang ............... C08G 18/7671 |

OTHER PUBLICATIONS

Website: Clextral /Technologies & lines/Technologies & processes/ Benefits of Twin Screw Extrusion (Year: 2013).*
Website:Tecnomatic/Facts You Need to Know about Single Screw Extruders (Year: 2017).*
Website: bufca.co.uk/polyurethane-foam-benefits/ (Year: 2018).*
Machine Translation of WO2013153190 (Year: 2013).*
Extended Search Report dated Apr. 7, 2015 in European Patent Application No. 15155374.0.
International Search Report and Written Opinion dated Mar. 22, 2016 in corresponding Patent Application No. PCT/EP2016/052676.
International Search Report dated Mar. 22, 2016 in PCT/EP2016/052676 filed Feb. 9, 2016.

\* cited by examiner

PROCESS FOR PRODUCING FOAMS BASED ON THERMOPLASTIC POLYURETHANES

DESCRIPTION

This invention relates to a process for production of expanded pellets from a polymer melt comprising a blowing agent. Expanded pellets of thermoplastic polymers, especially of thermoplastic polyurethane (TPU), have elastic and tribological properties and so are useful in a wide variety of applications. Examples of uses for expanded pellets of thermoplastic polyurethane include reusable gymnastics mats, body protectors, trim elements in automobile building, sound and vibration absorbers, packaging or in shoe soles. High elasticity and good homogeneity on the part of the pellets are of decisive importance for all these sectors.

WO 2007/082838 discloses a process for production of expanded thermoplastic polyurethane comprising a blowing agent. A first step of the process comprises extruding a thermoplastic polyurethane into pellets. The pellets are impregnated with a blowing agent in an aqueous suspension under pressure in a second step and expanded in a third step. In a further embodiment of the process, the thermoplastic polyurethane is melted in an extruder together with a blowing agent and the melt is pelletized without a device to prevent foaming. Volatile organic compounds are used as blowing agents in the production via extrusion.

WO 2013/153190 relates to a method for producing expanded granules from a propellant-containing polymer melt, comprising the steps: a) pressing the propellant-containing polymer melt through a perforated plate controlled to a temperature between 150'C. and 280'C. into a granulation chamber; b) comminuting the polymer melt pressed through the temperature-controlled perforated plate into individual expanding granules with a cutting device; c) discharging the granules from the granulation chamber with a fluid stream, wherein the propellant contains CO2 or N2 or a combination of CO2 and N2, and a fluid controlled to a temperature between 10'C. and 60'C. and having a pressure between 0.7 bar and 20 bar above the ambient pressure is caused to flow through the granulation chamber, and wherein the pressure and temperature of the fluid in the granulation chamber as well as the temperature of the perforated plate are selected such that the granules in the fluid under pressure are expanded by the propellant they contain in such a manner that expanded granules with a closed skin are created.

IF only one extruder to produce foamed thermoplastic polyurethane particles (E-TPU) is used it is sometimes difficult to control all processing parameters, such as temperature, pressure and rotation speed, in order to achieve the desired product properties, such as cell size, density, thickness of the skin layer and independent cell ratio. Retention time and variation of rotation speed in the production process is limited.

Object of the present invention was to solve above-mentioned problems and to provide a precise and flexible process for producing foamed thermoplastic polyurethane particles. This problem was solved by a process for producing foamed thermoplastic polyurethane particles comprising the steps of a) melting a thermoplastic polyurethane in a first extruder E1,
b) injecting a gaseous blowing agent in a second extruder E2,
c) impregnating the gaseous blowing agent homogeneously into the thermoplastic polyurethane melt in a third extruder E3,
d) extruding the impregnated thermoplastic polyurethane melt through a die plate and granulating the melt in an underwater granulation device under temperature and pressure conditions to form foamed thermoplastic polyurethane particles.

In step a) the thermoplastic polyurethane is melted in the first extruder E1, which is preferably a single screw extruder. The melt viscosity of the thermoplastic polyurethane (TPU) is controlled in certain range by adjusting the parameters such as temperature, pressure and rotation speed to get suitable viscosity for gas dozing and steady feed to the second extruder E2. Using an extruder E1 only for melting TPU enables to select a wide range of TPU which are independent of hardness and molecular weight.

The thermoplastic polyurethane may be any desired thermoplastic polyurethane (TPU) known to a person skilled in the art. Thermoplastic polyurethanes and their methods of making have been extensively described, for example in Gerhard W. Becker and Dietrich Braun, Kunststoffhandbuch, volume 7, "Polyurethane", Carl Hanser Verlag, Munich, Vienna, 1993.

In step b) a gaseous blowing agent is injected into the thermoplastic polyurethane melt in the second extruder E2, which is preferably a twin screw extruder. Preferably $CO_2$ and/or $N_2$ and more preferably a combination of $CO_2$ and $N_2$ are used as gaseous blowing agents. A co-blowing agent can additionally be added to the polymer melt. Useful co-blowing agents include alkanes such as ethane, propane, butane, pentane, alcohols such as ethanol, isopropanol, halo-genated hydrocarbons or CFCs or a mixture thereof. The sole use of $CO_2$ and/or $N_2$ and also their combination as blowing agent is particularly advantageous, since they are inert gases, which are nonflammable, so that no potentially explosive atmospheres can arise in manufacture. Using a separate extruder E2 for injecting gaseous blowing agents enables to prolong gaseous blowing agent injection time.

If step c) is not used, the gaseous blowing agent would then have to be dispersed properly by controlling the parameters of the second extruder and cooling would have to be done in the latter half of the second extruder E2 by adjusting screw shape and controlling temperature.

The three extruders E1, E2 and E3 are connected in series, preferably extruder E1 is directly connected to Extruder E2 and Extruder E2 is directly connected to Extruder E3. Most preferably a single screw extruder is used as extruder E1 and extruder E3 and a twin extruder is used as Extruder E2.

Impregnating the gaseous blowing agent homogeneously into the thermoplastic polyurethane melt is carried out in a third extruder E3. Stabilization and cool down of TPU by low rotation and low sheer rate by controlling the parameters of the third extruder E3, which has cooling unit in the special shaped screw, to get aimed sell size, gravity, thickness of skin layer and independent sell ratio. Using a separate extruder E3 for impregnating the gaseous blowing agent into the thermoplastic polyurethane melt enables better gas diffusion in the melted TPU.

In step d) extruding the impregnated thermoplastic polyurethane melt through a die plate and granulating the melt in an underwater granulation device under temperature and pressure conditions to form foamed thermoplastic polyurethane particles (E-TPU).

Preferably the bulk density of the foamed thermoplastic polyurethane particles formed in step d) is in the range from 30 to 250 kg/m$^3$, preferably in the range from 100 to 200 kg/m$^3$.

Preferably the water in the underwater granulation device has a pressure in the range from 1 to 20 bar and a temperature in the range from 10 to 50° C. in order to achieve the desired bulk density the foamed thermoplastic polyurethane particles.

EXAMPLES

Raw Materials:
Elastollan 1180A (commercially available TPU of BASF SE)
Elastollan 1196A (commercially available TPU of BASF Japa)
Elastollan ET880 (commercially available TPU of BASF Japan)
Elastollan SP9324 (commercially available TPU of BASF SE)
Crosslinking agent Polyether polyol -MDI-based prepolymer
Binder for TPU form Elastan® C8008 C-B: 15% /MCP Following Set-up of the machine was used for examples 1-12:

3 different types of extruders are connected and following equipment is attached respectively;
1. Dryer to the 1st extruder. 2. Gas dosing system to the 2$^{nd}$ extruder. 3. Underwater pelletize system to the 3rd extruders.

TPU was melted in a 1st Extruder. Temperature conditions were adjusted dependent on TPU grade used.

Nitrogen and/or carbon dioxide were injected into the 2$^{nd}$ Extruder (46 mmcp twin extruder) using injection pumps.

Setting Temperature of heater zone C1 to C12 and AD (Adapter)

| C1 | C2 | C3 | C4 | C5 | C6 | C7 | C8 | C9 | C10 | C11 | C12 | C13 | C14 | AD |
|---|---|---|---|---|---|---|---|---|---|---|---|---|---|---|
| 200 | 200 | 190 | 190 | 190 | 190 | 190 | 190 | 190 | 190 | 190 | 190 | 190 | 180 | 180 |

Control conditions
Rotating speed: 47 rpm
Exit pressure : 7.5 MPa

Blowing agents:
N$_2$: Pressure 8 MPa (0.4~0.5% vs TPU)
CO$_2$: Pressure 4 MPa (1.1~.4% vs TPU)

A 3$^{rd}$ Extruder (65 mmcp single extruder with coolingable quadruple thread screw) was used for gas diffusion in the melted TPU Setting Temperature of heater zone C1 to C4 and AD (Adapter)

| Screw | C1 | C2 | C3 | C4 | AD |
|---|---|---|---|---|---|
| 160 | 170 | 190 | 190 | 190 | 180 |

Control conditions
Rotating speed: 24 rpm
Entrance pressure: 8 MPa
Die pressure: 9 MPa
Underwatergranulation:
Setting Temperature of adapter (between filter and die) and die

| Adapter | Die |
|---|---|
| 188 | 200 |

Following Set-up of the machine was used for comparative examples 13-15:

Comparative examples were used only 1 extruder which are implemented TPU melting, gas dosing and gas diffusion.

Setting Temperature of heater zone C1 to C12 and AD (Adapter)

| C1 | C2 | C3 | C4 | C5 | C6 | C7 | C8 | C9 | C10 | C11 | C12 | C13 | C14 | AD |
|---|---|---|---|---|---|---|---|---|---|---|---|---|---|---|
| 160 | 180 | 190 | 190 | 190 | 190 | 190 | 190 | 190 | 190 | 190 | 190 | 190 | 180 | 180 |

Underwatergranulation:
Setting Temperature of adapter (between filter and die) and die

| Adapter | Die |
|---|---|
| 188 | 200 |

Molding Conditions:
TPU-foam particles from example 1-15 were molded using PU binder Elastan C8008 and pressed 30 minutes at 80° C. Physical properties of the moldings are summarized in Table 1.

Testing:
Mold density and compressive strength were determined according to JIS K 6767.

Tensile strength and elongation at break were determined according to JIS K 6400.

Tear strength and Rebound resilience were determined according to JIS K 7311.

Compression set was determined

TABLE 1

Physical properties of Examples 1-15

| | | \multicolumn{9}{c}{Example} | | | | | | | | |
|---|---|---|---|---|---|---|---|---|---|---|
| | | 1 | 2 | 3 | 4 | 5 | 6 | 7 | 8 | 9 |
| Base TPU | | | | 1180A | | | | 1180A | | 1196 |
| gas | | | | $CO_2$ | | | | $CO_2 + N_2$ | | $CO_2$ |
| melt viscosity MFR [g/10 min] | | 5.4 | 5.4 | 16 | 16 | 5.4 | 5.4 | 1.1 | 1.1 | 1.1 |
| crosslinker [%] | | 5 | 5 | 5 | — | 5 | 5 | 5 | 5 | 5 |
| particle bulk density | (g/l) | 170 | 200 | 170 | 170 | 160 | 200 | 160 | 180 | 190 |
| Compressive strength | 10% | 0.05 | 0.06 | 0.05 | 0.05 | 0.03 | 0.07 | 0.11 | 0.12 | 0.13 |
| | 25% | 0.13 | 0.15 | 0.13 | 0.11 | 0.08 | 0.14 | 0.35 | 0.40 | 0.50 |
| | 50% | 0.28 | 0.30 | 0.27 | 0.25 | 0.15 | 0.25 | 0.75 | 0.90 | 0.95 |
| Compressive elasticity modulus | (MPa) | 0.40 | 0.50 | 0.40 | 0.39 | 0.25 | 0.40 | 0.90 | 0.90 | 1.00 |
| rebound resilience | (%) | 53 | 53 | 49 | 47 | 49 | 50 | 27 | 26 | 26 |
| Compression set (23° C. × 22 hr) | (%) | 23 | 20 | 37 | 50 | 33 | 30 | 27 | 22 | 20 |

| | | \multicolumn{6}{c}{Example} | | | | | |
|---|---|---|---|---|---|---|---|
| | | 10 | 11 | 12 | 13 | 14 | 15 |
| Base TPU | | ET880 | | SP9324 | 1180A | SP9324 | 1196A |
| gas | | $CO_2$ | | $CO_2$ | $CO_2 + N_2$ | $CO_2 + N_2$ | $CO_2 + N_2$ |
| melt viscosity MFR [g/10 min] | | 10.2 | 10.2 | 23 | 5.4 | 23 | 1.1 |
| crosslinker [%] | | 5 | 5 | 5 | — | — | — |
| particle bulk density | (g/l) | 210 | 230 | 240 | 110 | 230 | Not expanded |
| Compressive strength | 10% | 0.05 | 0.06 | 0.07 | 0.03 | 0.05 | |
| | 25% | 0.13 | 0.14 | 0.15 | 0.08 | 0.12 | |
| | 50% | 0.24 | 0.25 | 0.27 | 0.16 | 0.24 | |
| Compressive elasticity modulus | (MPa) | 0.52 | 0.53 | 0.54 | 0.19 | 0.49 | |
| rebound resilience | (%) | 56 | 56 | 58 | 57 | 59 | |
| Compression set (23° C. × 22 hr) | (%) | 16 | 15 | 17 | | | |

We claim:

1. A process for producing foamed thermoplastic polyurethane particles, the process comprising:

a) melting a thermoplastic polyurethane in a first extruder E1, which is a single screw extruder, b) injecting a gaseous blowing agent in a second extruder E2, which is a twin extruder, c) impregnating the gaseous blowing agent homogeneously into the thermoplastic polyurethane melt in a third extruder E3, which is a single screw extruder operating at a lower rotation and lower sheer rate than said second extruder E2, and d) extruding the impregnated thermoplastic polyurethane melt through a die plate and granulating the melt in an underwater granulation device under temperature and pressure conditions to form foamed thermoplastic polyurethane particles, wherein a bulk density of the foamed thermoplastic polyurethane particles formed in step d) is from 30 to 250 kg/m³.

2. The process according to claim 1, wherein the gaseous blowing agent comprises $CO_2$, $N_2$, or a combination of $CO_2$ and $N_2$.

3. The process according to claim 1, wherein a single screw extruder is used as the first extruder E1 and the third extruder E3, and a twin extruder is used as the second Extruder E2.

4. The process according to claim 1, wherein the water in the underwater granulation device has a pressure in the range from 1 to 20 bar and a temperature in the range from 10 to 50° C.

5. The process according to claim 1, wherein the bulk density of the foamed thermoplastic polyurethane particles formed in step d) is from 100 to 200 kg/m$^3$.

6. The process according to claim 1, wherein the bulk density of the foamed thermoplastic polyurethane particles formed in step d) is from 160 to 230 kg/m$^3$.

7. The process according to claim 1, wherein the thermoplastic polyurethane further comprises a crosslinking agent that is polyether polyol-MDI-based prepolymer.

8. The process according to claim 7, wherein the gaseous blowing agent comprises $CO_2$, $N_2$, or a combination of $CO_2$ and $N_2$.

\* \* \* \* \*